Feb. 7, 1928.

H. W. DYER 1,658,187

REFRIGERATING SYSTEM

Filed May 28, 1924

2 Sheets-Sheet 1

INVENTOR.
Harry W. Dyer.
BY
ATTORNEY.

Feb. 7, 1928.

H. W. DYER 1,658,187

REFRIGERATING SYSTEM

Filed May 28, 1924    2 Sheets-Sheet 2

INVENTOR.

Harry W. Dyer

BY

ATTORNEY.

Patented Feb. 7, 1928.

1,658,187

UNITED STATES PATENT OFFICE.

HARRY W. DYER, OF NEW YORK, N. Y.

REFRIGERATING SYSTEM.

Application filed May 28, 1924. Serial No. 716,324.

Figure 1:
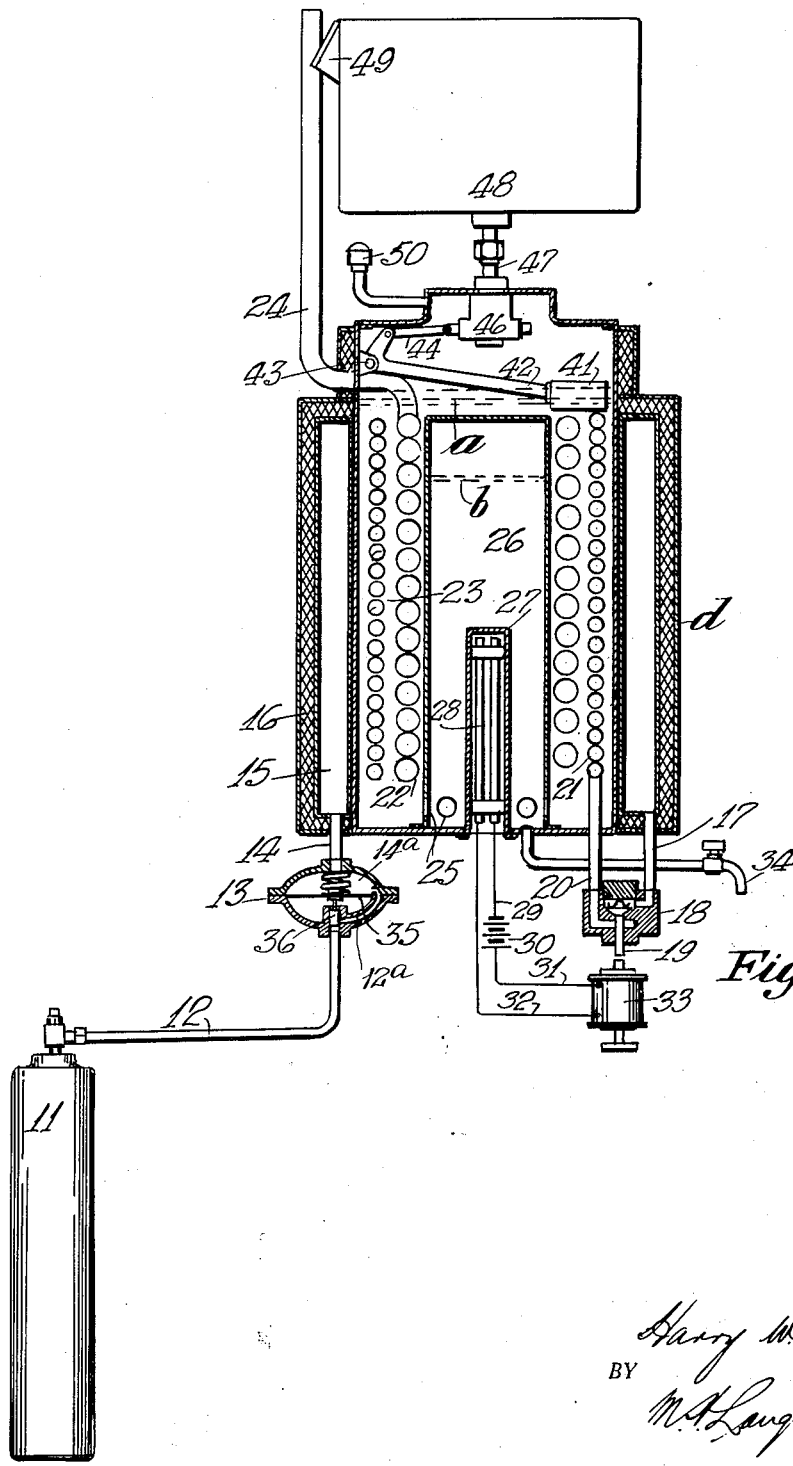
Figure 2:
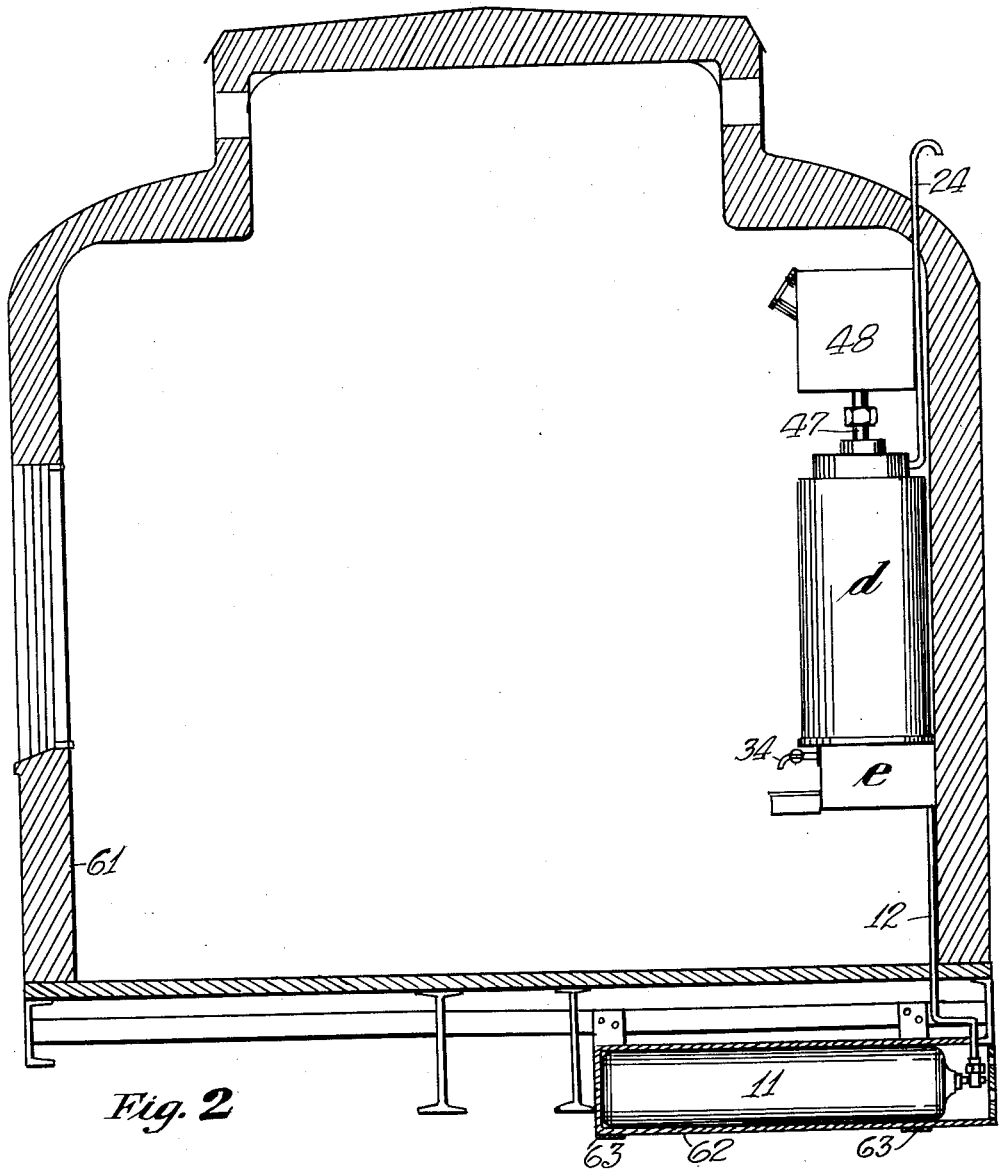

This invention relates to refrigerating apparatus and has for an object to provide means for cooling water and the like from a stored refrigerant. The invention is shown applied to cooling drinking water on passenger cars of railway trains for which purpose it is particularly adapted although the details of construction are of general use in refrigerators. The objects of the invention will be more particularly understood from the following specification and the accompanying drawings in which Fig. 1, is a sectional elevation of the refrigerating device showing the working features of the system and Fig. 2 is a sectional elevation of a passenger coach with my invention in place.

This invention comprises a tank which is automatically fed with liquid from a reservoir. A refrigerating coil is placed within this tank which is fed through a valve controlled by a thermostat with carbonic acid gas from an expansion tank. This expansion tank, in turn, is fed from a flask of liquid carbonic acid through a reducing valve; the flask, thus contains the stored refrigerant which is used as the temperature of the liquid demands. The waste gas from the refrigerating coil is vented to the atmosphere.

Referring to the drawings, 11 is a flask of liquid carbonic acid gas of the usual commercial type, 12 is a connection to the reducing valve 13. This valve is of the diaphragm type having a diaphragm 35 which controls the piston valve 36 against the pressure in pipe 12. When the pressure in chamber 14ª is reduced below a predetermined value the pressure in pipe 12 raises piston valve 36 against the coil spring until the passage 12ª is opened permitting the passage of gas from pipe 12 to the chamber 14ª thereby restoring the pressure in this chamber, which, together with the coil spring restores the piston valve to the position shown closing the passage 12ª. This expansion chamber 15 is jacketed as indicated at 16 with a heat resisting material.

From the expansion chamber 15 the refrigerant is fed through pipe 17 to valve 18 operated by the valve stem 19 to control the passage between pipe 17 and pipe 20 which leads to the small refrigerating coil 21 and from this coil to the larger coil 22 from which it eventually exhausts through the vent pipe 24.

The tank 23 is filled with water or liquid up to the line $a$ by means hereafter to be described. In this liquid the refrigerating coil is immersed and through openings 25 the liquid flows into the inner tank 26 where it may rise to the level indicated by $b$ compressing the air in the upper part of this tank. The cooled liquid is drawn off through the connection 34 from the inner tank 26.

In the centre of the inner tank the tube 27 is placed which is open at the lower end to receive the thermostat 28. The thermostat is thus in position to respond to changes of temperature in the liquid in tank 26. Connected with the thermostat is the solenoid 33 controlled by battery 30 and by wires 29, 31 and 32. When the temperature rises above a predetermined value the thermostat completes the circuit which energizes solenoid 33 thereby raising valve stem 19 and renewing the supply of refrigerant to coil 21. When the temperature is lowered the thermostat opens the circuit permitting the valve 19 to seat and close the passage between 17 and 20.

Water is supplied to the tank 23 from the reservoir 48 which may be filled through the opening 49. Pipe 47 connects 48 with the valve 46 which is controlled by the float 41, lever 42 pivoted at 43 and connection 44. The float 41, thus automatically renews the water supply as it is consumed. Pipe 50 vents the chamber 23 to atmosphere.

In operation the liquid carbonic acid gas in flask 11 vaporizes at about 600 lbs. pressure and through the reducing valve 13 it is expanded into chamber 15 at a pressure of 100 lbs. or less. The cold refrigerant is preserved in this chamber which, it will be noted, is placed in contact with the wall of the liquid chamber while the outside walls are insulated with a heat resisting covering. The refrigerant in thus expanding, extracts heat from the liquid over a large area and produces an initial cooling effect. Further cooling is under control of the thermostat through the valve 18 and the refrigerating coils immersed in the liquid. Two coils are shown of different sizes to provide for the expansion of the gas as it moves towards the exhaust. Further expansion may be provided for by the use of a number of coils of different sizes. As carbonic acid gas is heavier than air, air cannot enter the refrigerating coil through the vent pipe. The inner tank 26 from which the liquid is drawn confines the refrigerating coil to the outer tank and the bottom of this coil is placed above the openings 25 to the inner tank. Should a leakage develop in coils 21 or 22, the escaping gas would rise to the surface $a$ and be vented to atmosphere through 50. This provides for separating the escaping gas from the water which is being used.

The application of this invention to a railway coach is shown in Fig. 2. The flask 11 is placed beneath the floor in a housing 62 secured by cleats 63 and accessible for renewal purposes from the side of the coach. The reducing valve and the controlling valve are housed in chamber $e$, and $d$ indicates the outside of the cooling tank constructed as shown in Fig. 1. The exhaust pipe 24 leads through the roof of the car 61 as shown. The exhaust is thus readily dissipated as the car moves along the track.

This invention provides an automatic refrigerating system which is self contained and which uses a stored refrigerant of an economical and efficient character.

Having thus described my invention, I claim:

1. In a refrigerating system of the class described, the combination of a chamber to be cooled, a refrigerating coil in said chamber, an expansion tank surrounding and in contact with said chamber, a heat insulating covering for the exposed walls of said expansion tank, a tank with a refrigerant connected with said expansion tank and means controlled by the temperature of said cooling chamber controlling the passage to said refrigerating coil.

2. In a refrigerating system of the class described, the combination of a chamber to be cooled, a refrigerating coil in said chamber, an annular expansion tank surrounding said chamber, a reducing valve, a tank for storing a refrigerant, said storage tank connected to said expansion tank through said reducing valve and means controlled by the temperature of said cooling chamber controlling the passage to said refrigerating coil.

3. In a refrigerating system of the class described, the combination of an outer and an inner tank with a free passage therebetween, a refrigerating coil in one of said tanks, a storage tank with a supply of refrigerant and means controlled by the temperature of the inner tank for regulating the passage to said refrigerating coil.

4. In a refrigerating system of the class described, the combination of an outer and an inner tank containing a liquid with a passage connecting said tanks at the bottom, a refrigerating coil in one of said tanks located above the connecting passage, a storage reservoir with a supply of refrigerant, means for drawing liquid from the tank not having the refrigerating coil and means controlled by the temperature of said liquid for controlling the passage to said refrigerating coil.

Signed at New York in the county of New York and State of New York this 8th day of May, A. D. 1924.

HARRY W. DYER.